(12) United States Patent
Kaplan

(10) Patent No.: US 12,346,994 B2
(45) Date of Patent: Jul. 1, 2025

(54) METHOD AND SYSTEM FOR VIRTUAL INTELLIGENCE USER INTERACTION

(71) Applicant: MeetKai, Inc., Marina Del Rey, CA (US)

(72) Inventor: James Kaplan, Marina Del Rey, CA (US)

(73) Assignee: MEETKAI, INC, Marina Del Rey, CA (US)

( * ) Notice: Subject to any disclaimer, the term of this patent is extended or adjusted under 35 U.S.C. 154(b) by 224 days.

(21) Appl. No.: 18/095,987

(22) Filed: Jan. 11, 2023

(65) Prior Publication Data

US 2023/0230293 A1 Jul. 20, 2023

Related U.S. Application Data

(60) Provisional application No. 63/298,582, filed on Jan. 11, 2022.

(51) Int. Cl.
*G06T 11/00* (2006.01)
*G06F 3/01* (2006.01)
(Continued)

(52) U.S. Cl.
CPC .............. *G06T 11/00* (2013.01); *G06F 3/011* (2013.01); *G06F 3/017* (2013.01); *G10L 13/02* (2013.01);
(Continued)

(58) Field of Classification Search
CPC ........ G06F 3/011; G06F 3/017; G06F 18/214; G06F 18/21375; G06F 16/3329;
(Continued)

(56) References Cited

U.S. PATENT DOCUMENTS 7,831,564 B1 11/2010 Wei
8,700,608 B2 4/2014 Belknap
(Continued)

FOREIGN PATENT DOCUMENTS

CN 110728363 1/2020
KR 10-2002-0030545 4/2002
(Continued)

OTHER PUBLICATIONS

Jason Wu, et al. "NADiA: Neural Network Driven Virtual Human Conversation Agents", IVA 18: Proceedings of the 18th International Conference on Intelligent Virtual Agents, Nov. 5, 2018 [retrieved on Apr. 27, 2023]. Retrieved from<URL: https://doi.org/10.1145/3267851.3267860>, pp. 173-178.

*Primary Examiner* — Wesner Sajous
(74) *Attorney, Agent, or Firm* — Command IP LLP; Pejman Yedidsion

(57) ABSTRACT

A method and apparatus to generate and update virtual personification using artificial intelligence comprising a system configured to perform the following. Receive data associated with a person such as text files, audio files, image files, and video files. Render a virtual personification of the person and output the virtual personification to a user, such as on a display screen. Then, receiving and interpreting a user input to generate a user request, and then updating the virtual personification. The update may include generating an audio output using the text files and the audio files of the person and/or generating a video output using the image files and the video files of the person. The audio output and the video output is presented to the user by the virtual personification and it has not previously occurred by the person or thing represented by the virtual personification.

19 Claims, 5 Drawing Sheets

(51) Int. Cl.
   *G06F 18/214* (2023.01)
   *G10L 13/02* (2013.01)
   *G10L 15/18* (2013.01)
   *G10L 15/22* (2006.01)
   *G10L 15/30* (2013.01)
   *G10L 25/57* (2013.01)
   *G10L 25/84* (2013.01)

(52) U.S. Cl.
   CPC .......... *G10L 15/1815* (2013.01); *G10L 15/22* (2013.01); *G10L 15/30* (2013.01); *G10L 25/57* (2013.01); *G10L 25/84* (2013.01)

(58) Field of Classification Search
   CPC . G06F 16/90332; G06T 11/001; G06T 13/40; G06T 13/205; G06T 15/003; G06T 19/00; G06N 20/00; G06N 20/20; G06N 5/01; G06N 5/025; G06N 3/0455; G06N 3/0464; G06N 3/084; G06N 7/01; G06V 10/462; G06V 40/23; G06V 30/10; G06V 10/80; A63F 2300/6607; G06K 9/00342; G06K 9/6256; G06K 9/4671
   See application file for complete search history.

(56) References Cited

U.S. PATENT DOCUMENTS

| | | |
|---|---|---|
| 8,952,970 B2 | 2/2015 | Song |
| 8,981,962 B2 | 3/2015 | Fu |
| 9,267,518 B2 | 2/2016 | Chang |
| 9,607,102 B2 | 3/2017 | Lavallee et al. |
| 9,654,598 B1 | 5/2017 | Crawford et al. |
| 9,721,570 B1 | 8/2017 | Beal et al. |
| 10,156,775 B2 | 12/2018 | Zimmermann |
| 10,402,460 B1 | 9/2019 | Jesensky et al. |
| 10,402,589 B1 | 9/2019 | Madisetti et al. |
| 10,827,028 B1 | 11/2020 | Bromand |
| 11,042,369 B1 | 6/2021 | Kimball |
| 11,107,465 B2 | 8/2021 | Gustman et al. |
| 11,295,735 B1 | 4/2022 | Anuar |
| 2002/0032591 A1 | 3/2002 | Mahaffy |
| 2002/0080726 A1 | 6/2002 | Klassen |
| 2005/0124906 A1 | 6/2005 | Childre et al. |
| 2007/0043736 A1 | 2/2007 | Jain |
| 2007/0064276 A1 | 3/2007 | Park |
| 2009/0106321 A1 | 4/2009 | Das |
| 2010/0205222 A1 | 8/2010 | Gajdos |
| 2010/0217604 A1 | 8/2010 | Baldwin |
| 2011/0246496 A1 | 10/2011 | Chung |
| 2012/0317108 A1 | 12/2012 | Okazaki |
| 2013/0030804 A1 | 1/2013 | Zavaliagkos |
| 2013/0080177 A1 | 3/2013 | Chen |
| 2013/0304758 A1 | 11/2013 | Gruber |
| 2014/0167760 A1 | 6/2014 | Koh |
| 2014/0222436 A1 | 8/2014 | Binder |
| 2014/0244712 A1 | 8/2014 | Walters |
| 2014/0337032 A1 | 11/2014 | Aleksic |
| 2015/0051502 A1 | 2/2015 | Ross |
| 2015/0106737 A1 | 4/2015 | Montoy-Wilson et al. |
| 2015/0199010 A1 | 7/2015 | Coleman et al. |
| 2015/0288857 A1 | 10/2015 | Fay et al. |
| 2015/0339590 A1 | 11/2015 | Maarek |
| 2015/0351655 A1 | 12/2015 | Coleman |
| 2016/0019434 A1* | 1/2016 | Caldwell .............. G06V 10/462 345/474 |
| 2016/0166197 A1 | 6/2016 | Venkatraman |
| 2016/0205188 A1 | 7/2016 | Doraiswamy |
| 2017/0039045 A1 | 2/2017 | Abrahami |
| 2017/0039291 A1 | 2/2017 | Singh et al. |
| 2017/0046124 A1 | 2/2017 | Nostrant |
| 2017/0092270 A1 | 3/2017 | Newendorp et al. |
| 2017/0188976 A1 | 7/2017 | Kalra |
| 2017/0206797 A1 | 7/2017 | Solomon |
| 2017/0316280 A1* | 11/2017 | Caldwell .............. G06V 10/462 |
| 2017/0333666 A1 | 11/2017 | Goldberg et al. |
| 2017/0357637 A1 | 12/2017 | Nell et al. |
| 2017/0357910 A1 | 12/2017 | Sommer et al. |
| 2018/0011903 A1 | 1/2018 | Abolhassani et al. |
| 2018/0027126 A1 | 1/2018 | Stricker |
| 2018/0054228 A1 | 2/2018 | Lin |
| 2018/0075145 A1 | 3/2018 | Zhao et al. |
| 2018/0089410 A1 | 3/2018 | Caso |
| 2018/0096678 A1 | 4/2018 | Zhou et al. |
| 2018/0159889 A1 | 6/2018 | Sjouwerman |
| 2018/0181608 A1 | 6/2018 | Wu |
| 2018/0213037 A1 | 7/2018 | Roman |
| 2018/0232920 A1 | 8/2018 | Faulkner et al. |
| 2018/0242149 A1 | 8/2018 | Verma |
| 2018/0262391 A1 | 9/2018 | Jung |
| 2018/0300679 A1 | 10/2018 | Mahmood |
| 2018/0315499 A1 | 11/2018 | Appelbaum |
| 2018/0330723 A1 | 11/2018 | Acero |
| 2018/0337875 A1 | 11/2018 | Friio |
| 2018/0374474 A1 | 12/2018 | Wang |
| 2019/0035396 A1 | 1/2019 | Adamski |
| 2019/0042955 A1 | 2/2019 | Cahill et al. |
| 2019/0050686 A1 | 2/2019 | Moustafa et al. |
| 2019/0083034 A1 | 3/2019 | Shim et al. |
| 2019/0122121 A1 | 4/2019 | Yu |
| 2019/0155566 A1 | 5/2019 | Dory |
| 2019/0205322 A1 | 7/2019 | Dobrynin |
| 2019/0215673 A1 | 7/2019 | Choi |
| 2019/0269376 A1 | 9/2019 | Butani |
| 2019/0354599 A1 | 11/2019 | Mital |
| 2019/0385606 A1 | 12/2019 | Won |
| 2020/0001040 A1 | 1/2020 | Gloria |
| 2020/0042286 A1 | 2/2020 | Bui |
| 2020/0092519 A1 | 3/2020 | Shin et al. |
| 2020/0125600 A1 | 4/2020 | Jo |
| 2020/0242146 A1 | 7/2020 | Kalukin |
| 2020/0243082 A1 | 7/2020 | Yoshida |
| 2020/0327431 A1 | 10/2020 | Woo |
| 2020/0335102 A1 | 10/2020 | Lefkofsky |
| 2020/0342968 A1 | 10/2020 | Avinash |
| 2020/0402502 A1 | 12/2020 | Hanes |
| 2020/0410986 A1 | 12/2020 | Shen |
| 2021/0011887 A1 | 1/2021 | Visser |
| 2021/0011933 A1 | 1/2021 | Liu |
| 2021/0049827 A1 | 2/2021 | Lebaredian |
| 2021/0056753 A1 | 2/2021 | Yasar |
| 2021/0073215 A1 | 3/2021 | Srinivasaraghavan |
| 2021/0165974 A1 | 6/2021 | Lee |
| 2021/0201174 A1 | 7/2021 | Huang |
| 2021/0297494 A1 | 9/2021 | Kaplan |
| 2021/0304020 A1 | 9/2021 | Kaplan |
| 2021/0366473 A1 | 11/2021 | Maeng |
| 2021/0398671 A1 | 12/2021 | Gnanasambandam |
| 2022/0068261 A1 | 3/2022 | Sharifi |
| 2022/0157315 A1 | 5/2022 | Raux |
| 2022/0172714 A1 | 6/2022 | Kwatra |
| 2023/0027078 A1* | 1/2023 | Marks .................. G06N 20/20 |

FOREIGN PATENT DOCUMENTS

| | | |
|---|---|---|
| KR | 10-20100035391 | 8/2010 |
| KR | 10-2018-0050771 | 5/2018 |
| KR | 10-20160178837 | 5/2018 |
| KR | 10-2018-0096183 | 8/2018 |
| KR | 10-2019-0080834 | 7/2019 |
| KR | 1020190094307 | 8/2019 |
| KR | 20190106269 | 9/2019 |
| WO | WO 2019/172946 | 9/2019 |
| WO | WO 2019/183062 | 9/2019 |
| WO | WO 2020/136615 | 7/2020 |
| WO | WO 2020/247590 | 12/2020 |

* cited by examiner

METHOD AND SYSTEM FOR VIRTUAL INTELLIGENCE USER INTERACTION

1. FIELD OF THE INVENTION

The present invention is directed to a method and system to provide user interaction with virtual personifications using artificial intelligence ("AI").

2. DESCRIPTION OF THE RELATED ART

Advancement with VR and AR technology now allows for users to view real or simulated environments, (referred to as virtual environments) using a screen equipped headset or a traditional screen. Within these virtual environments, user have been able to view elements and move about to further explore the world. However, user interaction with current technology on virtual avatar is typically based on pre-recorded, pre-scripted, image or audio files. In other words, the user can look about the environment and travel from place to place within the environment but beyond that, interaction with the virtual environment is limited.

Other systems allow for some interaction with the virtual environment to obtain information about an items in the environment, such as to click on an items to obtain additional information. However, the interaction with elements in the virtual environment is limited to pre-created or pre-recorded information that typically is no more than a short pre-recorded message or text that is typically non-responsive and often no better than a frustrating voice script. These systems lack individualization to the particular user's interest and specific questions and are sterile in that prior art systems are no better than simply reading an article or watching a video on a web site.

SUMMARY

To overcome the drawbacks of the prior art and provide additional benefits, disclosed is a system and method to generate and update virtual personification using artificial intelligence receiving data associated with a person, the data comprising one or more of the following: text files, audio files, image files, and video files, and rendering a virtual personification of the person and outputting the virtual personification to a user. Then, receiving and interpreting a user input to generate a user request and updating the virtual personification in response to the user request. The update comprising one or more of the following. Responsive to the user request, generating an audio output using the text and audio files of the person and responsive to the user request, generating a video output using the image files and the video files of the person, such that the audio output and the video output is presented to the user by the virtual personification. Furthermore, the audio output and the video output presented by the virtual personification has not previously occurred by the person or thing represented by the virtual personification.

In one embodiment, the virtual personification is of a person, either living or deceased. It is contemplated that the virtual personification may comprise an audio output and video output which are presented in a virtual environment of a type associated with the virtual personification. The virtual personification may comprise a representation of a non-living item.

In one embodiment, the method is further configured to, responsive to being unable to create the generated response at the virtual reality device, transmit the question or request from the user to a remote artificial intelligence module. The remote artificial intelligence module may be a computing device with a processor and memory storing machine readable code configured to receive the question or request from the user via the virtual reality device, process the question or request to derive a meaning, and perform one or more searches for answers to the question or request in databases unrelated to the virtual personification. Upon locating an answer to the question or request, generating data that represents the virtual personification answering the question or request and transmitting the answer or the data that represents the virtual personification answering the question or request to the virtual reality device for presentation to the user. It is also contemplated that the method may further comprise tracking a user's hand position using one or more user hand position tracking devices to determine what the user is pointing at in the virtual environment. The step of generating a response to the question or request may use artificial intelligence to generate an answer by searching one or more databases that contain information from the person represented by the virtual personification but which to not provide a direct answer to the question or request.

Also disclosed is a system for presenting an interactive, artificial intelligence assisted, virtual personification to a user comprising a virtual reality device configured to have at least a portion be worn by the user. The virtual reality device includes a wearable screen configured for viewing by a user, one or more speakers configured to provide audio output to the user, a microphone configured to receive audio input from the user, and one or more external input devices configured to receive input from the user. Also part of the virtual reality device includes a communication module configured to communicate over a computer network or Internet, and a processor with access to a memory. The processor executes machine readable code and the memory is configured to store the machine readable code. The machine readable code is configured to present a virtual environment on the wearable screen and through the one or more speakers to the user and present, to the user on the wearable screen and through the one or more speakers, a virtual personification of a person currently living or deceased, in the virtual environment. The code is also configured to receive a question or request from the user regarding one or more aspects of the virtual environment or the virtual personification and then generate a response to the question or request from the user, which includes generating video content and audio content which did not previously exist. The code then presents the generated response to the user on the wearable screen and through the one or more speakers in response to question or request from the user.

In one embodiment, the machine readable code is further configured to, responsive to being unable to create the generated response at the virtual reality device, transmit the question or request from the user to a remote artificial intelligence module. It is further contemplated that the remote artificial intelligence module may be a computing device with memory and processor such that memory store machine readable code configured to receive the question or request from the user via the virtual reality device, process the question or request to derive a meaning, and perform one or more searches for answers to the question or request in databases unrelated to the virtual personification. Then, upon locating an answer to the question or request, generating data that represents the virtual personification answering the question or request, and transmitting the answer or the data that represents the virtual personification answering the question or request to the virtual reality device for presentation to the user.

The system may further comprise one or more user hand position tracking device configured to track a position of a user's hand to determine what the user is pointing at in the virtual environment. In one embodiment, the input from the user comprises an audio input or an input to the one or more external input devices. It is contemplated that generating video content and audio content which did not previously exist is generated by processing existing video, audio, or both, of the person represented by the virtual personification, to form the video content and audio content which did not previously exist. In addition, the generated response to the question or request uses artificial intelligence to generate an answer by searching one or more databases that contain information from a person represented by the virtual personification but which to not provide a direct answer to the question or request.

Also disclosed herein is a method for presenting an interactive experience with a virtual personification using a screen, speakers, and microphone of a user computing device. In one embodiment the method comprises a virtual environment on the wearable screen and through the one or more speakers to the user and present the virtual personification in the virtual environment. Then, receiving input from the user comprising a question, a user request, or subject regarding one or more aspects of the virtual environment, the virtual personification, or the actions of the virtual personification in the virtual environment. This method then sends a request for a response to the input from the user to an AI computing device that is remote from the user computing device, and with the AI computing device, create a response based on pre-existing content stored in one or more databases which is processed to create the generated response. Then, transmitting the generated response to the user computing device and, at the user computing device, based on the generated response from the AI computing device, generating video content and audio content which did not previously exist. Finally, the method of operation presents video content and audio content which did not previously exist to the user.

In one embodiment, the AI computing device is a computing device with memory and processor such that the memory stores machine readable code configured to receive the input from the user computing device, process the input from the user to derive a meaning, and based on the meaning, perform one or more searches for answers to the input from the user in databases unrelated to the virtual personification. Upon locating an response to the input from the user, generate data that represents the virtual personification answering the question or request, and transmit the data, that represents the virtual personification responding to the input from the user, to the user computing device.

This method may further include monitoring one or more user hand position tracking devices configured to track a position of a user's hand to determine what the user is pointing at in the virtual environment and interpreting the pointing as the input from the user. It is contemplated that the input from the user comprises an audio input or an input from the user to the one or more external input devices. The step of generating video content and audio content which did not previously exist occurs by processing existing video, audio, or both of a person represented by the virtual personification to generate new content.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Glossary of Terms

Figure 1A:
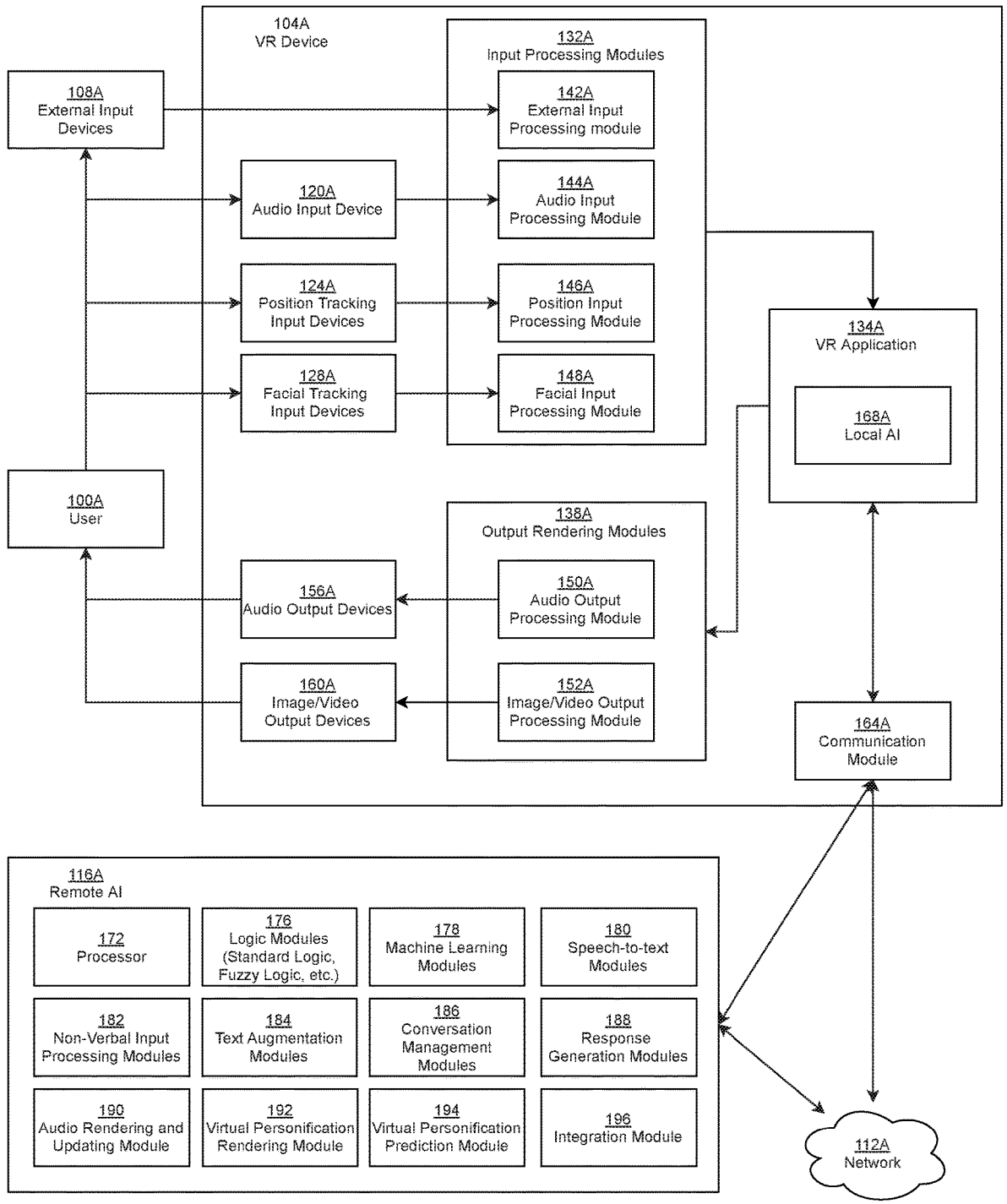
FIG. 1A illustrates a first exemplary embodiment of the present virtual personification AI system integrated into a virtual reality system.

AI services: Services provided as procedures and methods to a program to accomplish artificial intelligence goals. Examples may include, but are not limited to, image modeling, text modeling, forecasting, planning, recommendations, search, speech processing, audio processing, audio generation, text generation, image generation, and many more.

Device: A device is any element running with a minimum of a CPU or a system which is used to interface with a device. Optionally, an accelerator can be attached in the form of a GPU or other specialized hardware accelerator. This accelerator can speed up the computation of AI services.

Application: An application is any software running on any device such as mobile devices, laptop, desktop, server, smart watches, tablets, home speakers, wearable devices including smart rings, glasses, hearing aids, CarPlay devices, security cameras, webcams, televisions, projection screen monitors, sound bars, personal computers, headphones, earbuds, and laptop devices where a user can interact with touch, audio, visual, or passively.

The following terms are used in this document and the following definitions are provided to aid in understanding but should be interpreted as being limiting in scope AI services: Services provided as procedures and methods to a program to accomplish artificial intelligence goals. Examples may include, but are not limited to, image modeling, text modeling, forecasting, planning, recommendations, search, speech processing, audio processing, audio generation, text generation, image generation, and many more.

Device: A device is any element running with a minimum of a CPU or a system which is used to interface with a device. Optionally, an accelerator can be attached in the form of a GPU or other specialized hardware accelerator. This accelerator can speed up the computation of AI services.

Application: An application is any software running on any device such as mobile devices, laptop, desktop, server, smart watches, tablets, home speakers, wearable devices including smart rings, glasses, hearing aids, CarPlay devices, security cameras, webcams, televisions, projection screen monitors, sound bars, personal computers, headphones, earbuds, and laptop devices where a user can interact with touch, audio, visual, or passively.

In this disclosure, a virtual personification system may analyze pre-recorded data to generate dynamic responses to user requests/questions through virtual personifications. In one embodiment, the virtual personification may be a virtual representation which may be based on a real person. For example, the user, a family member or relative, a famous person, a historical figure, or any other type person. The virtual representation may also be a user or computer created person that does not represent a real person. Pre-recorded data may include image, video, or audio footage of the real person (such as YouTube and other film footage). Dynamic responses are generated to user requests/questions related to that known person, even though pre-recorded data may not include any adequate responses or responses which will match the question.

For example, a user may wish to be provided with a recipe from a famous chef, such as Gordon Ramsey, to make grilled salmon. Upon determination that pre-recorded data exists on Gordon Ramsey making another type of grilled chicken, the virtual personification may analyze Gordon Ramsey's footage on making grilled chicken and grilled potatoes to generate a virtual personification of Gordon Ramsey guiding the user through the process of making grilled salmon, as if Gordon Ramsey were in a cooking show and personally providing detailed instructions to the specific user request. The system AI can pull details from prior recordings and manipulate the visual and audio files to create a new virtual representation that is directly and accurately responsive to the user's request. AI may generate new information, such as how to adjust the response to be responsive to the specific user request. In the example of the cooking question, AI can understand the user's request, analyze the information already provided by the chef about how to cook chicken, realize that chicken is not salmon, and then search for a recipe for salmon by the same chef or recipe, and then process the new recipe and the virtual representation to present the new recipe to the user of the system using the virtual representation, as if the original chef was actually providing the recipe for salmon and not chicken. Although applied to food, this example may be applied to any other topic or environment of use.

The virtual personification of Gordon Ramsey may use a voice that sounds like Gordon Ramsey, may be dressed like Gordon Ramsey, as he typically appears on cooking shows, and may mimic Gordon Ramsey's body language and speech pattern. AI may be used to create the virtual personification even in situations when the actual person never actually provided a responsive answer in a video or audio recording. The virtual representation may be created using built-in AI modules such as a virtual personification rendering module (discussed in more details below) or using third-party tools, which the virtual personification system may interface with.

In another example, the user may attempt Gordon Ramsey's recipe of scrambled eggs, which may already be available on YouTube, and which may involve the use of milk. However, upon determination he has no milk in the fridge, the user may wish to ask Gordon Ramsey whether whipped cream may be used as a substitute. While in the existing footage on YouTube, Gordon Ramsey may not have provided an answer to that question, the virtual personification may analyze Gordon Ramsey's footage on substituting other items for milk to generate a virtual personification of Gordon Ramsey to answer this user question. The virtual personification of Gordon Ramsey may include a prediction of Gordon Ramsey's typical reaction in such situations. For example, the AI may determine, based on pre-recorded data, that Gordon Ramsey typically acts impatiently to such questions. Thus, the virtual personification of Gordon Ramsey may display a frown or curt gestures when providing the predicted answer.

In one embodiment, the virtual personification may be presented in a virtual reality space, which may be rendered using a virtual reality system. For example, in a cooking environment, the virtual reality space may be a kitchen. For other topics, such as carpentry the environment may be a wood working shop, car repair would appear in an auto garage, education may appear as a classroom, and information about a topic may actually appear inside the items, such as inside a virtual computer or a virtual engine to show how something works in combination with AI that creates answers for the user using the virtual reality space and the virtual personification.

FIG. 1A illustrates a first exemplary embodiment of the present virtual personification AI system integrated into a virtual reality system. The virtual reality space is rendered by a virtual reality system. Exemplary virtual reality systems are described in U.S. Pat. No. 9,898,091, U.S. Patent Publication 2014/0364212, and U.S. Patent Publication 2015/0234189, which are incorporated by reference herein in their entirety as teaching exemplary virtual reality systems and methods. A user 100A may access the virtual reality space by the one or more components of a virtual reality system, such as a virtual reality device ("VR device") 104A and external input devices 108A, which may be accessories to the VR device 104A. The VR device 104A may be in direct communication with the external input devices 108A (such as by Bluetooth®) or via network 112A providing internet or signals (e.g., a personal area network, a local area network ("LAN"), a wireless LAN, a wide area network, etc.). The VR device 104A may also communicate with a remote AI 116A via the network 112A.

In a preferred embodiment, the VR device 104A may be a wearable user device such as a virtual reality headset ("VR headset"), and the external input devices 108A may be hand-held controllers where a user may provide additional input such as arm motion, hand gestures, and various selection or control input through buttons or joysticks on such controllers.

The VR device may generally include input devices 120A through 128A, input processing modules 132A, VR applications 134A, output rendering modules 138A, output devices 156A, 160A, and a communication module 164A. Input devices may include one or more audio input devices 120A (such as microphones), one or more position tracking input devices 124A (to detect a user's position and motion), and one or more facial tracking input devices 128A (such as facial cameras to detect facial expressions, eye-tracking camera to detect gaze and eye movement, etc.). Additional external input devices may provide user biometrics data or tracking of other user body parts.

The input processing modules 132A may include, but are not limited to, an external input processing module 142A (used to process external inputs such as input from external devices 108A or additional external input devices discussed above), an audio input processing module 144A (used to process audio inputs, such as user speech or sounds), a position input processing module 146A (to process position and motion tracking inputs such as hand motions, finger motions, arm motions, head position), and a facial input processing module 148A (to process facial inputs of the user).

The VR applications 134A are generally responsible for rendering virtual reality spaces associated with their respective VR applications 134A. For example, a VR museum application may render a virtual museum through which a user may traverse and present various artwork which the user may view or interact with. This is achieved through the VR application's 134A integration with output rendering modules 138A, which in turn presents the rendered files on output devices 156A, 160A.

Specifically, the output rendering modules 138A may include, but are not limited to, an audio output processing module 150A responsible for processing audio files, and an image and/or video output processing module 152A, responsible for processing image and/or video files. In turn, one or more audio output devices 156A, such as built-in speakers on the VR headset may present the processed audio file, and one or more image and/or video output devices 160A (such as a built-in screen on the VR headset) may display the processed image and/or video files. Other types of output may include, but are not limited to, motion or temperature changes to the VR device 104A or the external input devices 108A (such as vibration on hand-held controllers).

User interaction may in turn modify the virtual reality space. For example, if a user inputs motion to indicate he picked up a vase, the rendered virtual reality space may display a vase moving in accordance with the user's motion. Thus, the transmission of information occurs in a bi-directional streaming fashion, from the user 100A to the VR device 104A and/or external input devices 108A, then from the VR device 104A and/or external input devices 108A back to the user 100A. U.S. application Ser. No. 17/218,021 provides a more detailed discussion on bi-directional streaming using AI services and examples of broader and specific uses.

The AI may be completely or partially built into the VR device 104A or specific VR applications 134A. Such built-in AI components may be referred to a local AI 168A. Other AI components may be located in the remote AI 116A, which may be operating on remote devices or on cloud-based servers. The local and remote AI 168A, 116A may communicate via the network 112A.

The AI may enhance the user's 100A interaction with the virtual reality system using the embodiments and methods described above. The AI may include one or more of the following components to generally operate the AI and process data, one or more processors 172 and one or more memory storage devices where logic modules 176 and machine learning modules 178 may be stored to provide general AI services. The memory storage devices may further include one or more modules to specifically enhance user-VR interaction, such as speech-to-text modules 180, non-verbal input processing modules 182, text augmentation modules 184, conversation management modules 186, response generation modules 188, audio rendering and updating modules 190, virtual personification rendering modules 192, virtual personification prediction modules 194, and integration modules 196.

The speech-to-text modules 180 may be used to perform voice detection and customized speech to text recognition, as well as to generally detect, recognize, process, and interpret user audio input. Recognition allows the speech-to-text modules 180 to distinguish between verbal input (such as a user question) and non-verbal input (such as the user's sigh of relief).

A user may start an active conversation in the virtual reality space by simply speaking. The speech-to-text modules 180 may use voice activity detection in order to differentiate that the user has started speaking, as opposed to ambient noise activity. When true speech is detected, the speech-to-text modules 180 may process the input audio from the microphone to recognize the user's spoken text. This processing can either happen as part of the viewing device (such as the VR device 104A), on a device connected to the viewing device, or on a remote server over the network (such as the remote AI 116A). This process may convert the stream of audio into the spoken language, such as text processable by a computer.

The speech-to-text modules 180 may be customized to the current scene that the user is experiencing inside the virtual space, or a virtual personification that the user wishes to interact with. This customization could allow for custom vocabulary to be recognized when it would make sense in the specific environment or specific virtual personification. For example, if a user were interacting with a virtual personification of a cooking chef, then the speech recognition system may be customized to enhance name recognition for words associated food, whereas in a different environment a different vocabulary would be used. If the virtual personification of Gordon Ramsey were in a kitchen, then the speech recognition system may be customized to enhance name recognition for kitchen utensils.

While the virtual reality system may have its own modules to process audio inputs, the AI's speech-to-text modules 180 are intended to integrate and enhance existing features in the virtual reality system. For example, the AI speech-to-text modules 180 may generate exponential amounts of interpretations from a single user input, automatically select the top interpretation based on user data, and hold multi-turn conversations with the user as a continuation of that single user input. Appendix A includes a more detailed discussion on systems and methods for enhanced speech-to-text. The enhanced speech-to-text and integration with other applications outside the virtual reality system, and the additional mechanism to recognize usable user input (as discussed in step 2) and to process out of scope user input.

The AI's non-verbal input processing modules 182 may be used to process non-verbal input. As discussed above, audio input may be non-verbal (such as a user's sigh of relief, or tone of voice). As well, external input devices 108A may include devices to track a user's biometrics or body parts other than arm, hand, and finger movement. Examples of devices to track a user's biometrics include but are not limited to smartwatches, Fitbits™, heart-rate monitors, blood pressure monitors, or any other devices which may be used to track a user's heart-rate, oxygen level, blood pressure, or any other metrics that may track a user's body condition. Such input may all be processed using additional processing modules, which may be part of the virtual reality system (such as built into the VR device 104A), and/or may be part of the local or remote AI 168A, 116A.

The text augmentation modules 184 may be used to add further context to the interpreted user 100A input. When the speech-to-text modules 180 has successfully transcribed the user's spoken text, the text augmentation modules 184 may supplement the spoken text with what the user is currently doing, or interacting with, to enhance its linguistic understanding of what the user has said. For example, this allows the AI to find co-references between what the user said and what they are looking at. Such as, if a user asks, "how old is this", the term "this" can be implied from what the user is currently looking at, touching, near, or pointing at in the virtual world. This functionality can be carried about by fusions of any or one of the following inputs: the user's head position, eye detection, hand position—including placement, grip, pointing, controller position, and general orientation. Furthermore, the system may also fuse in non-controller related signals, such as biometrics from heart rate, breathing patterns, and any other bio sensory information. This information is fused over time to detect not just instantaneous values for fusion but trends as well.

The text augmentation modules 184 may also be integrated with the non-verbal input processing modules 182 to receive further context. For example, in a multi-turn conversation where a user requests information, the user may input the word "okay". Conventional system may, by default, cease communication because the response "okay" may be pre-coded as a command to terminate interaction. The text augmentation modules 184, in contrast, may analyze the user's tone to detect (1) boredom, and interpret "okay" as a request to shorten the information provided, (2) hesitation or confusion, and interpret "okay" as a request for additional information, (3) impatience, and interpret "okay" as a request to end the interaction.

The text augmentation modules' 184 integration with other devices and modules may not be linear. Rather, context from the virtual reality system may be used in one or more steps of speech interpretation. For example, in a multi-turn conversation (such as the conversation described above), at each turn of a user input, the speech-to-text modules may be used to generate the most accurate interpretation of the user's input, and the non-verbal input processing module 182 may be used to inject more context. Further, the AI's conversation management modules 186 may be integrated with the text augmentation modules 184 to generate the output used in single or multi-turn conversations.

Once the AI has augmented the text by considering the current state of the virtual space in relation to the user, then a conversation may be carried out. The conversation management modules 186 may classify the spoken text into different categories to facilitate the open-ended conversation. First the conversation management modules 186 may determine if a statement is meant to initiate a new conversation or one that continues an existing conversation. If the user is detected to initiate a new conversation, then the conversation management modules 186 may classify the result among categories. A first category may include user comments that may not necessarily require a strong response. For example, if a user states "this is really cool", the conversation management modules 186 may render the virtual personification to respond with a more descriptive or expressive response in relation to what was remarked as being cool. Alternatively, the virtual personification may not respond. A second category may include user questions that may be in relation to the current scene. A third category may be user questions that are in relation to the non-virtualized world (i.e., reality).

In the second and third categories, the conversation management modules 186 may facilitate an answer to the question via the virtual personification. In the second category of a question being detected in relation to the virtual world, the system may then proceed down to one of two or more paths. The conversation management modules 186 may first attempt to use information in pre-recorded data to answer the question. For example, during a user interaction with a virtual Gordon Ramsey on making a grilled salmon, a user may ask about the use of an ingredient not in the current recipe. The conversation management modules 186 may retrieve footage from another video where Gordon Ramsey uses that ingredient and may render the virtual Gordon Ramsey to modify the current recipe to include that ingredient.

If no pre-recorded data exists, then the conversation management modules 186 request the response generation modules 188 to analyze additional data (such as data on Gordon Ramsey's presentation of a similar alternative ingredient or based on other chefs or known cooking information) to generate new behavior, speak, actions, response for the virtual Gordon Ramsey (such as the output of an opinion that the ingredient may not be desirable, or the rendering of Gordon Ramsey adding the ingredient to the recipe using Gordon Ramsey's voice and behavior). If the user is in an existing conversation, then the conversation management modules 186 may proceed with the same approach as in the previous section, but with the added impetus of considering the context. Using context and past conversation details in the AI system provides a more realistic user interaction and avoid the virtual representation from repeating themselves or providing the same response.

After the response is provided, the conversation management modules 186 may account for the likelihood that the user will continue to ask questions or follow ups to the previous response. The conversation management modules 186 may use this information to better carry out the next algorithm by utilizing this additional information.

The audio rendering and updating modules 190 may be used, both independently and/or in conjunction with other modules 188, to output audio. The audio rendering and updating modules 190 may ensure, for example, that the proper response to a user question to virtual Gordon Ramsey may indeed be in Gordon Ramsey's voice, tone, and speech pattern. For example, based on analysis of Gordon Ramsey's past audio files, the audio rendering and updating modules 190 may determine Gordon Ramsey frequently accompanies his speech with an exasperated sigh. As a result, the audio rendering and updating modules 190 may cause the virtual personification of Gordon Ramsey to output the same exasperated sigh in its user interactions. Additional analysis may be performed to customize speech of the virtual personification in the following areas: volume (such as a person who frequently speaks in raised voice), accent, tone (such as a person who likes to emphasize certain words), speech pattern, etc.

The audio rendering and updating modules 190 may also supplement the user experience with the appropriate background noise or music, which may be updated based on user action. For example, as virtual Gordon Ramsey guides the user through the experience of baking a cake, at one-point virtual Gordon Ramsey may show the user how to turn on a cake mixer. In addition to the visual rendering of a cake mixer that is currently in use, the audio rendering and updating modules 190 may update the ambient noise to a background noise of an operating cake mixer. At a later point, then virtual Gordon Ramsey turns the cake mixer off, the audio rendering and updating modules 190 may update the background noise of an operating cake mixer back to ambient noise. This would be true for any and all sounds in a virtual environment.

The virtual personification rendering module 192 may be used, in conjunction with other modules, to output the visual representation of the virtual personification. For example, the virtual personification rendering module 192 may be used to generate the virtual Gordon Ramsey, which may include a visual representation of one or more of the following: Gordon Ramsey's face, body, and clothing. The virtual personification rendering module 192 processes existing image or video of the person or item being personified and maps and creates new video from existing video and is also able to create new video or image from prior image and video to create a virtual personification that is doing or saying things which the original person never did or said.

The virtual personification prediction modules 194 may be used, in conjunction with other modules, to predict behavior and responses by the virtual personification. Particularly in cases where no existing pre-recording data exists, and the AI must generate new responses/behavior, the virtual personification rendering module 192 may be used to render predictions on the virtual personifications' responses, which may include one or more of the following: facial expressions, body movements, gestures, etc.

The integration modules 196 may be used to integrate the one or more modules described above, so they may operate in sync. For example, the response generation modules 188 may be integrated with the audio rendering and updating module to accurately output a virtual personification's speech using the proper voice and tone, which may, in turn, be integrated with the virtual personification rendering modules 192 and the virtual personification prediction modules 194 to ensure the coherence between the output of voice, facial expression, and body movements. In one embodiment, additional customization may be added to the virtual personification through additional modules. For example, additional modules may be added to analyze a person's temperament or personality and incorporate them into the virtual personification of that person.

Conventional virtual reality systems, and conversational AI systems, may not have the ability to hold multi-turn conversations. For example, following the user's request to add a first ingredient to a recipe, Gordon Ramsey may suggest the use of a second ingredient instead. The user may ask, "can you show me what that would look like". Conventional virtual reality systems may not understand what "that" is referring to, or incorrectly identify the user is still looking for a display of the first ingredient, or not have the requested information. In addition, the AI system would generate an image or video with what that added ingredient would look like even if such video or image footage never previously existed. In contrast, through the integration of speech-to-text modules 180, conversation management modules 186, and logic modules 176 such as natural language understanding modules, fuzzy logic modules, the AI would understand the user 100A, in continuation of the previous exchange, is referring to the second ingredient and may thus provide output that is truly responsive to the user's second input.

In addition to the robust speech interpretation and multi-conversation feature, the AI presents two other main improvements on conventional systems—unlimited data and analysis, and dynamic and predictive rendering. Using the previous example, a conventional rendering of a virtual Gordon Ramsey may be limited to existing video footage of Gordon Ramsey (such as, for example, a deep fake using Gordon Ramsey's face, or the output of a pre-recording of Gordon Ramsey). Further, a conventional software application used to render the virtual Gordon Ramsey may be limited to existing data in the local device. The AI, in contrast, may query any database accessible over the network to retrieve additional pre-recorded data, or generate rendering of virtual Gordon Ramsey in never-before-seen situations based on analysis of existing footage. Thus, not only is the entire universe of information available on the internet accessible by the user through AI, but additional information not currently existing on the internet may be predicted and generated.

Figure 1B:
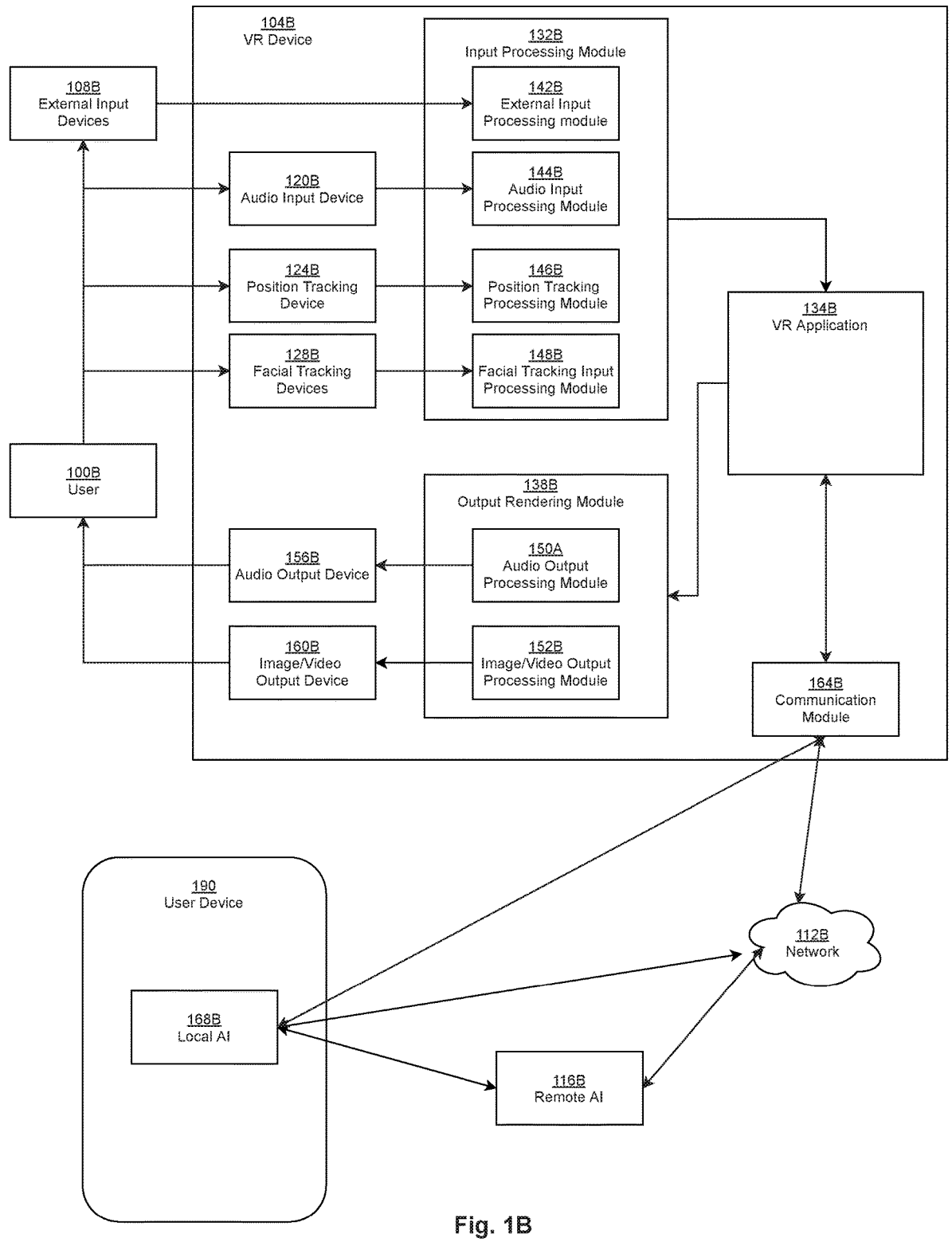
FIG. 1B illustrates a second exemplary embodiment of the virtual personification AI system which may use a local AI operating on a separate user device such as a smartphone, a tablet, a personal computer, etc.

FIG. 1B illustrates a second exemplary embodiment of the virtual personification AI system which may use a local AI 168B operating on a separate user device 190 such as a smartphone, a tablet, a personal computer, etc. Such separate user devices 190 may establish direct communication to the communication module 164 in the VR device 104B and/or a remote AI 116B housing additional AI modules or may communicate with the VR device 104B and remote AI 116B via the network 112B. The various AI components 172-196 illustrated in FIG. 1A and discussed above may be stored in the local AI 168B and/or the remote AI 116B. The external input devices 108B and the various VR device components 120B-164B may interact with each other and with the local and remote AIs 168B, 116B in similar fashion as described in FIG. 1A.

It is contemplated that in any embodiment, including but not limited to 1A and 1B, any one or more of the AI modules 172-196 may be included in the local AI 168 and/or the remote AI 116. In one embodiment, all AI modules 172-196 may be located on a local AI 168 operating in the VR device 104 such that no remote AI 116 may be necessary. Alternatively, all AI modules 172-196 may be located in a remote AI 116. In preferred embodiments, most or all AI modules 172-196 are in a remote AI 116 such that the AI may be integrated with any VR device 104, including VR devices 104 with no built-in local AI 168A. Such integration may be achieved using AI layers to power cross platform AI services, which is discussed in more details in U.S. application Ser. No. 17/218,021.

While VR devices may be the preferred device to implement the virtual personification AI system, it is intended that the virtual personification AI system may be used on any computing devices capable of performing user interaction. For example, the virtual personification AI system may be implemented on a device capable of performing AR display, such that the virtual personification may be output via AR technology. Similarly, the virtual personification AI system may be implemented on smartphones, tablets, personal computers, laptop devices, etc., where the virtual personification may be a 2-dimensional output on a display screen. In one embodiment, the virtual personification may be in audio-only mode, for implementation on a peripheral device (such as a vehicle with CarPlay) or wearable devices (such as smartwatches, smart rings, glasses, hearing aids, headphones, earbuds, etc.), home devices (such as home speakers, security cameras, webcams, televisions, projection screen monitors, sound bars, etc.), or any other electronic devices.

Figure 2:
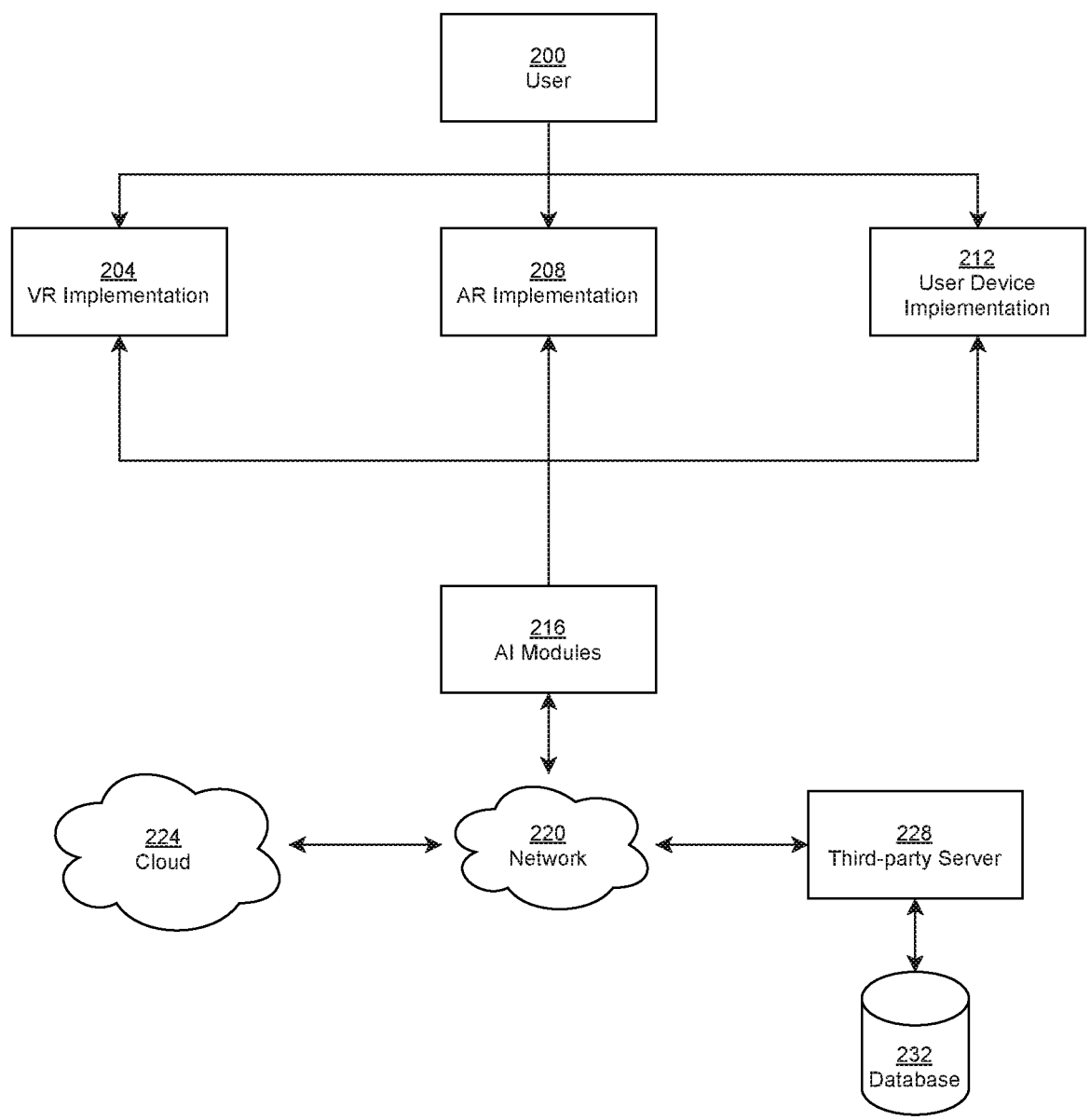
FIG. 2 illustrates an exemplary environment of use of the virtual personification AI system.

FIG. 2 illustrates an exemplary environment of use of the virtual personification AI system. In FIG. 2, a user 200 may interact with the following devices, which may, as discussed above, be capable of implementing the virtual personification AI system: a VR device 204 (as illustrated in FIG. 1), an AR device 208, or any other computing device 212 (such as a computer, a smart TV, or a smartphone). These devices 204-212 may then implement the AI modules 220 (which are separately illustrated as 172-196 in FIG. 1A and discussed above). Such implementation may be, as discussed above, locally, remotely, or both.

In one embodiment, the AI modules 220 may be integrated with third-party tools such as virtual representation modules 216 and audio data modules 224. Virtual representation modules 216 may be any additional tools used to generate virtual personifications and virtual environments. Audio data modules 224 may be additional tools used to generate audio for virtual personifications and virtual environments.

The AI modules 220 and its integrated third-party tools 216, 224 may be in direct communication, or communicate via a network 228 to access programs, servers, and/or databases stored in a cloud 232 and/or cloud-based servers, as well as other devices 236, which may in turn be connected to their respective databases 240. In one embodiment, the AI modules 220 may access the third-party tools 216, 224 remotely, such as via the network 228. The AI modules 220 may thus access resources from all connected programs, devices, servers, and/or databases.

Figure 3:
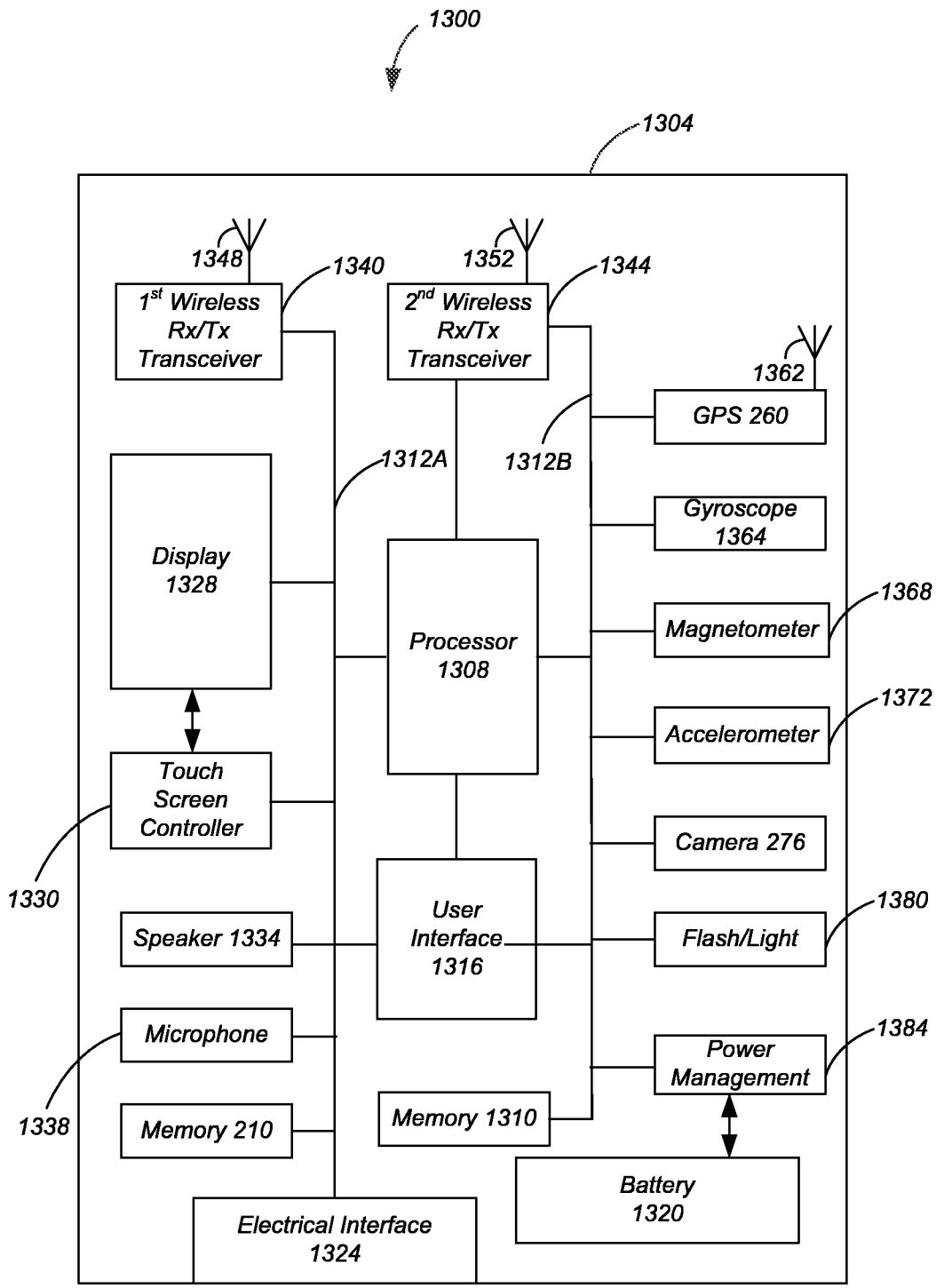
FIG. 3 illustrates a block diagram of an example embodiment of a computing device, also referred to as a user device which may or may not be mobile.

FIG. 3 illustrates an example embodiment of a mobile device on which a solution generator may operate, also referred to as a user device which may or may not be mobile. This is but one possible mobile device configuration and as such, it is contemplated that one of ordinary skill in the art may differently configure the mobile device. The mobile device 300 may comprise any type of mobile communication device capable of performing as described below. The mobile device may comprise a Personal Digital Assistant ("PDA"), cellular telephone, smart phone, tablet PC, wireless electronic pad, an IoT device, a "wearable" electronic device or any other computing device.

In this example embodiment, the mobile device 300 is configured with an outer housing 304 designed to protect and contain the components described below. Within the housing 304 is a processor 308 and a first and second bus 312A, 312B (collectively 312). The processor 308 communicates over the buses 312 with the other components of the mobile device 300. The processor 308 may comprise any type processor or controller capable of performing as described herein. The processor 308 may comprise a general purpose processor, ASIC, ARM, DSP, controller, or any other type processing device. The processor 308 and other elements of the mobile device 300 receive power from a battery 320 or other power source. An electrical interface 324 provides one or more electrical ports to electrically interface with the mobile device, such as with a second electronic device, computer, a medical device, or a power supply/charging device. The interface 324 may comprise any type electrical interface or connector format.

One or more memories 310 are part of the mobile device 300 for storage of machine readable code for execution on the processor 308 and for storage of data, such as image, audio, user, location, accelerometer, or any other type of data. The memory 310 may comprise RAM, ROM, flash memory, optical memory, or micro-drive memory. The machine readable code (software modules and/or routines) as described herein is non-transitory.

As part of this embodiment, the processor 308 connects to a user interface 316. The user interface 316 may comprise any system or device configured to accept user input to control the mobile device. The user interface 316 may comprise one or more of the following: microphone, keyboard, roller ball, buttons, wheels, pointer key, touch pad, and touch screen. Also provide is a touch screen controller 330 which interfaces through the bus 312 and connects to a display 328.

The display comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of such technologies. The display 328 receives signals from the processor 308, and these signals are translated by the display into text and images as is understood in the art. The display 328 may further comprise a display processor (not shown) or controller that interfaces with the processor 308. The touch screen controller 330 may comprise a module configured to receive signals from a touch screen which is overlaid on the display 328.

Also part of this exemplary mobile device is a speaker 334 and microphone 338. The speaker 334 and microphone 338 may be controlled by the processor 308. The microphone 338 is configured to receive and convert audio signals to electrical signals based on processor 308 control. Likewise, the processor 308 may activate the speaker 334 to generate audio signals. These devices operate as is understood in the art and as such, are not described in detail herein.

Also connected to one or more of the buses 312 is a first wireless transceiver 340 and a second wireless transceiver 344, each of which connect to respective antennas 348, 352. The first and second transceivers 340, 344 are configured to receive incoming signals from a remote transmitter and perform analog front-end processing on the signals to generate analog baseband signals. The incoming signal may be further processed by conversion to a digital format, such as by an analog to digital converter, for subsequent processing by the processor 308. Likewise, the first and second transceivers 340, 344 are configured to receive outgoing signals from the processor 308, or another component of the mobile device 308, and up convert these signals from baseband to RF frequency for transmission over the respective antenna 348, 352. Although shown with a first wireless transceiver 340 and a second wireless transceiver 344, it is contemplated that the mobile device 300 may have only one or two such systems, or more transceivers. For example, some devices are tri-band or quad-band capable, or have Bluetooth®, NFC, or other communication capability.

It is contemplated that the mobile device 300, hence the first wireless transceiver 340 and a second wireless transceiver 344, may be configured to operate according to any presently existing or future developed wireless standard including, but not limited to, Bluetooth, WI-FI such as IEEE 802.11a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device 300 is one or more systems connected to the second bus 312B which also interfaces with the processor 308. These devices include a global positioning system (GPS) module 360 with associated antenna 362. The GPS module 360 is capable of receiving and processing signals from satellites or other transponders to generate data regarding the location, direction of travel, and speed of the GPS module 360. GPS is generally understood in the art and hence not described in detail herein. A gyroscope 364 connects to the bus 312B to generate and provide orientation data regarding the orientation of the mobile device 300. A magnetometer 368 is provided to supply directional information to the mobile device 300. An accelerometer 372 connects to the bus 312B to provide information or data regarding shocks or forces experienced by the mobile device. In one configuration, the accelerometer 372 and gyroscope 364 generate and provide data to the processor 308 to indicate a movement path and orientation of the mobile device 300.

One or more cameras (still, video, or both) 376 are provided to capture image data for storage in the memory 310 and/or for possible transmission over a wireless or wired link, or for viewing at a later time. The one or more cameras 376 may be configured to detect an image using visible light and/or near-infrared light. The cameras 376 may also be configured to utilize image intensification, active illumination, or thermal vision to obtain images in dark environments. The processor 308 may process machine-readable code that is stored on the memory to perform the functions described herein.

A flasher and/or flashlight 380, such as an LED light, are provided and are processor controllable. The flasher or flashlight 380 may serve as a strobe or traditional flashlight. The flasher or flashlight 380 may also be configured to emit near-infrared light. A power management module 384 interfaces with or monitors the battery 320 to manage power consumption, control battery charging, and provide supply voltages to the various devices which may require different power requirements.

Figure 4:
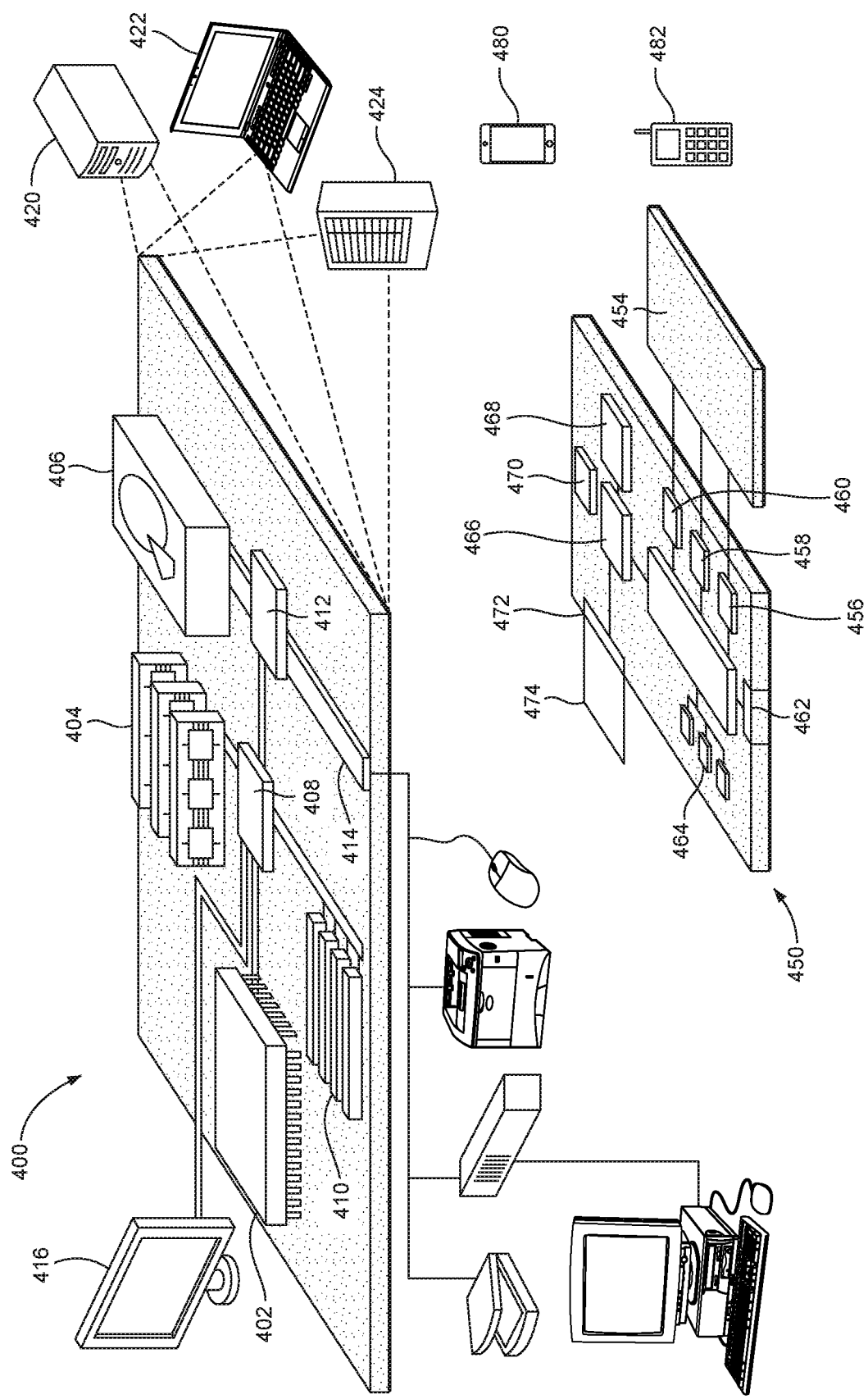
FIG. 4 is a block diagram of an exemplary computing device, mobile device, or server, such as one of the devices described above, according to one exemplary embodiment.

FIG. 4 is a block diagram of an exemplary computing device, mobile device, or server, such as one of the devices described above, according to one exemplary embodiment. Computing device 400 is intended to represent various forms of digital computers, such as smartphones, tablets, kiosks, laptops, desktops, workstations, personal digital assistants, servers, blade servers, mainframes, and other appropriate computers. Computing device 400 is intended to represent various forms of mobile devices, such as personal digital assistants, cellular telephones, smart phones, and other similar computing devices. The components shown, their connections and relationships, and their functions, are meant to be exemplary only, and are not meant to limit the implementations described and/or claimed in this document.

Computing device 400 includes a processor 402, memory 404, a storage device 406, a high-speed interface or controller 408 connecting to memory 404 and high-speed expansion ports 410, and a low-speed interface or controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406, to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of functions is exemplary only. In one implementation, the high-speed controller 408 is coupled to memory 404, display 416 (i.e., through a graphics processor or accelerator), and to high-speed expansion ports 410, which may accept various expansion cards (not shown). In this representative implementation, low-speed controller 412 is coupled to storage device 406 and low-speed bus 414. The low-speed bus 414, which may include various communication ports (e.g., USB, Bluetooth, Ethernet, wireless Ethernet) may be coupled to one or more input/output devices, such as a keyboard, a pointing device, a scanner, or a networking device such as a switch or router (i.e., through a network adapter).

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device(s), to provide additional storage. Each of the components 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor 452 may be implemented as a chipset of chips that include separate and multiple analog and digital processors. The processor may provide, for example, for coordination of the other components of the computing device 450, such as control of user interfaces, applications run by the computing device 450, and wireless communication by the computing device 450.

Processor 452 may communicate with a user through control interface 458 and display interface 456 coupled to a display 454. For example, the display 454 may be a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, to enable near area communication of computing device 450 with other devices. In some implementations external interface 462 may provide for wired communication, or in other implementations, for wireless communication, whilst multiple interfaces may also be used.

The memory 464 stores information within the computing device 450. The memory 464 can be implemented as one or more of a computer-readable medium or media, a volatile or a non-volatile memory unit or units. Expansion memory 474 may also be provided and connected to the computing device 450 through expansion interface 472, which may include, for example, a SIMM (Single In Line Memory Module) card interface. Such expansion memory 474 may provide extra storage space and/or may also store applications or other information for the computing device 450. Specifically, expansion memory 474 may include instructions to carry out or supplement the processes described above and may also include secure information. Thus, for example, expansion memory 474 may be provided as a security module for computing device 450 and may be programmed with instructions that permit secure use of the same. In addition, secure applications may be provided via the DIMM cards, along with additional information, such as placing identifying information on the DIMM card in a non-hackable manner.

The memory may include for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received for example, over transceiver 468 or external interface 462.

The computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur for example, through a radio-frequency transceiver 468. In addition, short-range communication may occur, such as using a Bluetooth, Wi-Fi, or other such transceiver (not shown). In addition, GPS (Global Positioning system) receiver module 470 may provide additional navigation- and location-related wireless data to the computing device 450, which may be used as appropriate by applications running on the computing device 450.

The computing device 450 may also communicate audibly using audio codec 460, which may receive spoken information from a user and convert it to usable digital information. Audio codec 460 may likewise generate audible sound for a user, such as through a speaker, e.g., in a handset of the computing device 450. Such sound may include audio from voice telephone calls, recorded audio (e.g., voice messages, music files, etc.), and may also further include audio generated by applications operating on the computing device 450.

The computing device 450 may be implemented in a number of different forms, as shown in the figure. For example, it may be implemented as a cellular telephone 460. It may also be implemented as part of a smartphone 482, personal digital assistant, a computer tablet, or other similar mobile device.

Thus, various implementations of the systems and techniques described here can be realized in digital electronic circuitry, integrated circuitry, especially designed ASICs (application specific integrated circuits), computer hardware, firmware, software, and/or combinations thereof. These various implementations can include applications in one or more computer programs that are executable and/or interpretable on a programmable system, including at least one programmable processor which may be special or of general purpose, coupled to receive data and instructions, to and from a storage system, at least one input device, and at least one output device.

These computer programs (also known as programs software, software applications or code) include machine instructions for a programmable processor and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device LCD (liquid crystal display) monitor, LED, or any other flat panel display, for displaying information to the user, a keyboard, and a pointing device (e.g., mouse, joystick, trackball, or similar device) by which the user can provide input to the computer. Other kinds of devices can be used to provide for interaction with a user as well, for example; feedback provided to the user can be any form of sensory feedback (e.g., visual, auditory, or tactile); and input from the user can be received in any form, including acoustic, speech, or tactile input.

The systems and techniques described here may be implemented in a computing system (e.g., computing device 400 and/or 450) that includes a back end component, or that includes a middleware component (e.g., application server), or that includes a front-end component such as a client computer having a graphical user interface or a Web browser through which a user may interact with an implementation of the systems and techniques described herein, or any combination of such back-end, middleware, or front-end components. The components of the system may be interconnected by any form or medium of digital data communication, such as a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be appreciated that the virtual personification AI system may be used to implement many possible applications. For example, a conventional weather application may display weather searchable by pre-determined parameters (such as location and date). In contrast, the AI system may output a virtual personification of a popular on-camera meteorologist (such as Jim Cantore) to not only provide weather based on pre-determined parameters, but also to further interact with the user. For example, a user may first request the current weather and a forecast for Hawaii, and then ask, "what clothes should I pack for my upcoming vacation"? A conventional weather application will not understand the user question because it may not remember the context (weather in Hawaii). The virtual personification AI system, on the other hand, may not only understand the context of the user question and accurately determine the user's true request—a retrieval of the user's calendar to determine the accurate date range and/or location for the upcoming vacation, a projection of the weather during that date range, an analysis of proper attire given the weather, personal data (such as user preferences on clothing items), and location (which may take into account additional factors such as humidity, altitude, and local culture). Further, the AI may be capable of presenting the proper response to the user request using the virtual personification of Jim Cantore in a conversational format, even though that person has not previously answered that question or provided that particular response in the past.

It is contemplated that pre-recorded data may be analyzed, and virtual personifications may be generated, for any person(s), not just famous ones. For example, a user may submit family videos of a great-grandfather who has passed away, and the virtual personification system may render a virtual personification of the great-grandfather, who may interact with future generations. This concept may be applied to any person living or passed away. In addition, the system may create virtual personifications which have an appearance different to anyone alive or previously alive.

In one embodiment, the AI may supplement missing footage with its own. In the example where a user asks the virtual personification of Jillian Michaels, a fitness coach, for a standing core exercise, but no recording of Jillian Michaels performing such an exercise exists, then new rendering may be generated using Jillian Michaels' footage performing other, but similar actions, or other people performing the requested exercise, but rendered to appear as Jillian Michaels. The new rendering may be generated using deepfake or other technology to combine Jillian Michaels' footage with generic footage of another person performing a standing core exercise. As yet another alternative, the AI may provide a set of default footage (such as a default virtual model performing standing core exercises) and superimpose whatever footage of Jillian Michaels' may be available on the default model. It is contemplated that any other type of technology may be used to generate new rendering where no pre-recorded data exist.

Another possible expansion of the virtual personification AI system may be to generate and render entirely imaginary characters. For example, by combining a new character design for a two-headed animal with default models or existing footage of a dinosaur, a virtual personification of a new two-headed dinosaur may be generated, and its behavior may be based on analysis of a wolf, or it may interact with the user with the voice of an old man. Thus, virtual personification may be customized based on both pre-recorded data and user preferences. It is contemplated that the personification is not limited to people but other things (real or not real), such as but not limited to animals, robots, cars, birds, fish, extinct species, alien creatures, created items or beings, or any other item.

The virtual personification AI system's ability to generate any type of virtual personification and its versatility of customization enables broad application to all types of technology and environment. One exemplary use may be education, where classes and/or tutorials may be provided to students with virtual personification of an instructor on any subject, which may automate some or all of a student's classroom experience without compromising the student's personal interaction (such as to ask questions). As an improvement to in-person experiences, the virtual instructor may draw information from existing knowledge or databases, thereby providing answers a live instructor may not have. The class may be taught by a virtual representation of someone famous, such as Albert Einstein, Sandra Day O'Connor, or Alexander Graham Bell.

Another exemplary use may be training, which may include standardized training for professional purposes (such as customized professional training of airplane pilots using a virtual personification of a flight instructor and the cockpit), or training for hobbies or information learning (such as cooking with a virtual personification of Gordon Ramsey). In the case of an airplane, the virtual environment may react to different actions by the user, such as use of certain controls, to provide realistic training.

Similarly, the virtual personification AI system may be used to generate real-time response instructions, such as medical or emergency training. For example, a 9-1-1 dispatcher may assist a caller to perform CPR by transmitting footage of a virtual personification of medical personnel performing CPR on a patient while waiting for an ambulance to arrive. The caller may interact with the medical personnel by asking questions such as "the patient is still not breathing, now what"? Answers may be pulled from a database and the personification may actually perform the answer to the question so the user can see how to perform the medical training. This concept can be applied to teaching tools for medical procedures such that the virtual representations of the best doctors in the world can be created to show how to perform a procedure and dynamically respond to any question for personalized teaching.

Yet another exemplary use may be entertainment, such as allowing users to interact with famous people from the past or an imaginary character in a conversational setting. This allows people to have personal interactions with people from history and interact using the AI databases such that the virtual representation can answer any question or perform any action in real time during user interaction. These famous people from which the virtual representation is created could be any person, famous for any reason. A database may be created for each person so that the AI system can accurately create visual, audio, and knowledge representations.

Similarly, the virtual personification AI system may be used to generate real-time response instructions, such as medical or emergency training. For example, a 9-1-1 dispatcher may assist a caller to perform CPR by transmitting footage of a virtual personification of medical personnel performing CPR on a patient while waiting for an ambulance to arrive. The caller may interact with the medical personnel by asking questions such as "the patient is still not breathing, now what"?

In future expansions of the technology, it may also be possible to stimulate virtual personification without user input. For example, an entire lecture series may be generated using virtual personification of an instructor and combining footage of lecture recordings of past real-life lectures.

Anticipatory answers may be provided by analysis of recording of past student questions, thereby eliminating the need for further student interaction (which may still be provided as an additional feature).

Yet another example may be a simulated room where two virtual personifications may interact with each other instead of (or in addition to) interaction with users. For example, a user may wish to simulate a philosophical debate between Socrates and Kant. In one example, the virtual room may be expanded to include entire virtual worlds and large populations of virtual characters. The user can learn from seeing how two or more virtual representation interact, such as in professional environments, military situation, formal engagements, or social interaction.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A computer-implemented method to generate and update virtual personification of a person using artificial intelligence comprising the steps of:
receiving pre-recorded data associated with the person, the pre-recorded data comprising one or more of the following: text files including prerecorded text content, audio files including prerecorded audio content, image files including prerecorded image content, and video files prerecorded video content;
rendering a virtual personification of the person and outputting the virtual personification to a user;
receiving and interpreting an input from the user to generate a user request;
updating the virtual personification in response to the user request by retrieving additional data available on the Internet and manipulating the pre-recorded data using the additional data, the update comprising one or more of the following:
generating a new audio output including new audio content that is responsive to the user request, by manipulating the prerecorded text content of the text files and the prerecorded audio content of the audio files of the person; and
generating a new video output including new video content that is responsive to the user request, by manipulating the prerecorded image content of the image files and the prerecorded video content of the video files of the person,
wherein the virtual personification including the new audio output and the new video output is presented to the user through one or more speakers and a wearable screen; and
wherein at least a portion of the new audio content and a portion of the new video content is different from the prerecorded text content, the prerecorded audio content, the prerecorded image content, and the prerecorded video content.

2. The method of claim 1 wherein the virtual personification is of a person, either living or deceased.

3. The method of claim 1 wherein the virtual personification comprises an audio output and video output is presented in a virtual environment of a type associated with the virtual personification.

4. The method of claim 1 wherein the virtual personification comprises a representation of a non-living item.

5. The method of claim 1 wherein the method is further configured to, responsive to being unable to create the generated response at the virtual reality device, transmit the question or request from the user to a remote artificial intelligence module.

6. The method of claim 5, wherein the remote artificial intelligence module is a computing device with a processor and memory storing machine readable code configured to:
receive the question or request from the user via the virtual reality device;
process the question or request to derive a meaning;
perform one or more searches for answers to the question or request in databases unrelated to the virtual personification;
upon locating an answer to the question or request, generating data that represents the virtual personification answering the question or request; and
transmitting the answer or the data that represents the virtual personification answering the question or request to the virtual reality device for presentation to the user.

7. The method of claim 1 further comprising tracking a hand position of a user with one or more user hand position tracking devices to determine what the user is pointing at in the virtual environment.

8. The method of claim 1 wherein the generated response to the question or request uses artificial intelligence to generate an answer by searching one or more databases that contain information from the person represented by the virtual personification but which does not provide a direct answer to the question or request.

9. A system for presenting an interactive, artificial intelligence assisted, virtual personification to a user comprising:
a virtual reality device configured to have at least a portion be worn by the user comprising:
a wearable screen configured for viewing by a user;
one or more speakers configured to provide audio output to the user;
a microphone configured to receive audio input from the user;
one or more external input devices configured to receive input from the user;
a communication module configured to communicate over a computer network or Internet;
a processor configured to execute machine readable code;
a memory configured to store the machine readable code, the machine readable code configured to:
present a virtual environment on the wearable screen and sounds of the virtual environment through the one or more speakers to the user;
present, to the user on the wearable screen and through the one or more speakers, a voice of a virtual personification of a person currently living or deceased, in the virtual environment;
receive a question or request from the user regarding one or more aspects of the virtual environment or the virtual personification;
generate a generated response to the question or request from the user, which includes generating new video content and new audio content that did not previously exist;
present the new video content generated response to the user on the wearable screen and the new audio content generated response through the one or more speakers in response to the question or request from the user;

wherein the new audio content is generated by manipulating a prerecorded text content and a prerecorded audio content, and the new video content is generated by manipulating a prerecorded image content and a prerecorded video content of the person, and wherein at least a portion of the new audio content and a portion of the new video content is different from the prerecorded text content, the prerecorded audio content, the prerecorded image content, and the prerecorded video content; and transmit the question or request from the user to a remote artificial intelligence module responsive to being unable to create the generated response at the virtual reality device.

10. The system of claim 9 wherein the remote artificial intelligence module is a computing device with memory and processor such that the memory stores machine readable code configured to:

receive the question or request from the user via the virtual reality device;

process the question or request to derive a meaning;

perform one or more searches for answers to the question or request in databases unrelated to the virtual personification;

upon locating an answer to the question or request, generate data that represents the virtual personification answering the question or request; and transmit the answer or the data that represents the virtual personification answering the question or request to the virtual reality device for presentation to the user.

11. The system of claim 9 further comprising one or more user hand position tracking devices configured to track a position of a user's hand to determine what the user is pointing at in the virtual environment.

12. The system of claim 9 wherein the input from the user comprises an audio input or an input from the user to the one or more external input devices.

13. The system of claim 9 wherein generating video content and audio content which did not previously exist is generated by processing existing video, audio, or both of the person represented by the virtual personification.

14. The system of claim 9 wherein the generated response to the question or request is generated using artificial intelligence to generate an answer by searching one or more databases that contain information from the person represented by the virtual personification but which does not provide a direct answer to the question or request.

15. A method for presenting an interactive experience with a virtual personification using a screen, speakers, and microphone of a user computing device, wherein the user computing device includes a wearable screen and one or more speakers, the method comprising:

presenting a virtual environment on the wearable screen and sounds in the virtual environment through the one or more speakers to the user and presenting the virtual personification in the virtual environment;

receiving input from the user comprising a question, a request, or subject regarding one or more aspects of the virtual environment, the virtual personification, or the actions of the virtual personification in the virtual environment; sending a request for a response to the input from the user to an AI computing device that is remote from the user computing device; with the AI computing device, creating a response based on pre-existing content stored in one or more databases which is processed to create the generated response; transmitting the generated response to the user computing device;

at the user computing device, based on the generated response from the AI computing device, generating a new video content and a new audio content which did not previously exist; and presenting the new video content and the new audio content which did not previously exist to the user; wherein the new audio content is generated by manipulating a prerecorded text content and a prerecorded audio content, and the new video content is generated by manipulating a prerecorded image content and a prerecorded video content of a person; and wherein at least a portion of the new audio content and a portion of the new video content is different from the prerecorded text content, the prerecorded audio content, the prerecorded image content, and the prerecorded video content.

16. The system of claim 15 wherein the AI computing device is a computing device with memory and processor such that the memory stores machine readable code configured to:

receiving the input from the user computing device;

processing the input from the user to derive a meaning;

based on the meaning, performing one or more searches for answers to the input from the user in databases unrelated to the virtual personification;

upon locating a response to the input from the user, generating data that represents the virtual personification answering the question or request; and transmitting the data, that represents the virtual personification responding to the input from the user to the user computing device.

17. The system of claim 15 further monitoring one or more user hand position tracking devices configured to track a position of a user's hand to determine what the user is pointing at in the virtual environment and interpreting the pointing as the input from the user.

18. The system of claim 15 wherein the input from the user comprises an audio input or an input from the user to the one or more external input devices.

19. The system of claim 15 wherein generating video content and audio content which did not previously exist is generated by processing existing video, audio, or both of a person represented by the virtual personification to generate new content.

\* \* \* \* \*